United States Patent
Broussard et al.

(10) Patent No.: US 8,955,877 B2
(45) Date of Patent: Feb. 17, 2015

(54) KNEE AIRBAG MODULE

(75) Inventors: Marco Broussard, Dachau (DE); Konrad Gottschalk, Freising (DE); Holger Zang, Bergkirchen (DE)

(73) Assignee: Autoliv Development AB, Värgärda (SE)

( * ) Notice: Subject to any disclaimer, the term of this patent is extended or adjusted under 35 U.S.C. 154(b) by 0 days.

(21) Appl. No.: 13/985,608

(22) PCT Filed: May 6, 2011

(86) PCT No.: PCT/EP2011/002257
§ 371 (c)(1),
(2), (4) Date: Sep. 6, 2013

(87) PCT Pub. No.: WO2012/110058
PCT Pub. Date: Aug. 23, 2012

(65) Prior Publication Data
US 2014/0021701 A1  Jan. 23, 2014

(30) Foreign Application Priority Data
Feb. 16, 2011 (DE) ............. 20 2011 002 778 U

(51) Int. Cl.
*B60R 21/217* (2011.01)
*B60R 21/206* (2011.01)

(52) U.S. Cl.
CPC ........... *B60R 21/206* (2013.01); *B60R 21/2171* (2013.01)
USPC ....................................... 280/732; 280/728.2

(58) Field of Classification Search
CPC .......................... B60R 21/206; B60R 21/2171
USPC .................. 280/728.1, 728.2, 730.1, 732
See application file for complete search history.

(56) References Cited

U.S. PATENT DOCUMENTS 5,433,471 A  7/1995 Shepherd et al.
5,785,346 A * 7/1998 Benz et al. ............. 280/728.2
(Continued)

FOREIGN PATENT DOCUMENTS

DE  10 2006 023 203 A1  11/2006
GB  2 391 520 A  2/2004
(Continued)

OTHER PUBLICATIONS

PCT International Search Report—Dec. 6, 2011.

*Primary Examiner* — Ruth Ilan
*Assistant Examiner* — Timothy Wilhelm
(74) *Attorney, Agent, or Firm* — Brinks Gilson & Lione

(57) ABSTRACT

The invention relates to a knee airbag module having a housing, an airbag accommodated in the housing and a substantially cylindrical gas generator (50) accommodated in the housing for filling the airbag, wherein the housing has an upper wall (12) and a peripheral side wall having a front section, a rear section (24) and two side sections. In this connection, at least one side section has, adjacent to the front (22) section, an opening (30) through which one end (54) of the gas generator (50) passes at least in part through the side wall. From each of the two side sections a respective fastening flange (40) extends with a respective fastening section (40*a*) having a fastening surface. In order for the fastening surfaces to be relatively short, the fastening surfaces overlap the radial extension of the gas generator (50) in a vertical projection direction at least, wherein at least the fastening section (40*a*) of the fastening flange (40) which is adjacent to the opening (30) is spaced apart from the end (54) of the gas generator (50) facing same. Furthermore, in order to achieve simple mounting of the gas generator, the region of the side wall section in which the opening (30) is disposed can extend obliquely with respect to the gas generator axis.

11 Claims, 2 Drawing Sheets

(56) References Cited

U.S. PATENT DOCUMENTS

| | | | |
|---|---|---|---|
| 6,422,589 B1* | 7/2002 | Ostermann et al. | 280/728.2 |
| 6,715,789 B2* | 4/2004 | Mizuno et al. | 280/730.1 |
| 7,374,198 B2* | 5/2008 | Tata et al. | 280/728.2 |
| 7,384,065 B2* | 6/2008 | Takimoto et al. | 280/732 |
| 7,431,327 B2* | 10/2008 | Kretzschmar et al. | 280/728.2 |
| 7,614,644 B2* | 11/2009 | Hoffmann et al. | 280/728.2 |
| 7,850,196 B2* | 12/2010 | Kashiwagi | 280/728.2 |
| 2003/0094795 A1* | 5/2003 | Takimoto et al. | 280/730.1 |
| 2008/0238048 A1* | 10/2008 | Ishida | 280/728.2 |
| 2009/0058052 A1* | 3/2009 | Ford et al. | 280/730.1 |
| 2010/0109365 A1 | 5/2010 | Shibata et al. | |

FOREIGN PATENT DOCUMENTS

| | | |
|---|---|---|
| JP | WO 2010/131642 A1 | 11/2010 |
| WO | WO 2009/029203 A1 | 3/2009 |

\* cited by examiner

KNEE AIRBAG MODULE

CROSS REFERENCE TO RELATED APPLICATIONS

This application claims priority to German Patent Application No. 20 2011 002 778.3, filed Feb. 16, 2011 and PCT/EP2011/002257, filed May 6, 2011.

TECHNICAL FIELD OF THE INVENTION

The invention relates to a knee airbag module for a motor vehicle.

BACKGROUND

Knee airbag modules are becoming increasingly common in modern automobile construction. Such a knee airbag module consists basically of a housing, an airbag folded into the housing, and a gas generator connected to the housing. The airbag, which can be inflated by the gas generator, helps to prevent the knee and shin region of the protected occupant from striking against the relatively hard instrument panel, and further has the task of preventing the forward displacement of the occupant's pelvis in a head-on collision. This is especially important for unbelted occupants.

There are two basic concepts for arranging such a knee airbag module in a vehicle. In the first concept, the housing of the knee airbag module is around knee height of the protected occupant, and the opening of the housing points in the direction of the knee or shin. The airbag then basically expands in the direction of the occupant. In a second concept (low mount), the housing is in a lower section of the dashboard or in an adjacent area of the footroom cover. In this case, the housing, which can be made relatively flat, basically horizontal, means that the outlet opening of the housing extends basically horizontally. In this case the fully unfolded knee airbag generally has a "banana-shaped" cross section.

A generic "low mount" knee airbag module is described in De 10 2009 005 993 A1. The knee airbag module of that design has a housing with an upper wall and with a peripheral side wall. The gas generator is arranged nearly entirely within the housing and extends in the proximity of the front section of the peripheral side wall and parallel to the section. A fastening flange extends from each of the two opposite side sections of the side wall. The two fastening flanges serve to fasten the knee airbag module to a vehicle-secured structural component, for which purpose the flanges each have a fastening section, the surfaces of which face toward the vehicle are designated hereinafter as fastening surfaces. The two fastening surfaces are hereby relatively long, with the result that the corresponding vehicle-secured structural components must also have accordingly long fastening surfaces. On the basis of the fact that frequently there is only very little mounting room available, providing the accordingly long fastening surfaces in the vehicle can in many cases be problematic.

SUMMARY OF THE INVENTION

Proceeding therefrom, the task of the present invention is therefore to further develop a general knee airbag module such that only fastening surfaces of shorter length are required.

Since the expanding airbag transfers forces nearly exclusively to the gas generator, and the gas generator again directs forces into the housing, lever forces are generated when the fastening surfaces of the fastening flanges are spaced apart from the gas generator axis. According to the invention, the fastening surfaces of the fastening flanges therefore are arranged close to the gas generator axis, namely in such a way that the fastening surfaces of the fastening sections overlap the radial extent of the gas generator at least in a vertical projection direction with reference to the mounted state. In this way, the acting lever forces are strongly reduced, with the result that the fastening surfaces of the fastening flanges and thus also the corresponding fastening mating surfaces of a vehicle-secured structural component need to be only relatively short. The length of the fastening surfaces of the fastening flanges relates here to the longitudinal direction of the vehicle.

However, since at least one end of the gas generator must be accessible from outside of the housing, and preferably projects from the housing at least in part through an opening, it is necessary that at least the fastening section of the fastening flange, which is adjacent to the corresponding opening in the peripheral side wall, is spaced apart from the facing end of the gas generator.

In a first preferred embodiment, the fastening surface overlaps directly with the radial extent of the gas generator. That means that if the gas generator were extended in the axial direction, the gas generator would strike the fastening surface. In this case, there must be a free space between the fastening section and the gas generator.

In a second preferred exemplary embodiment, the fastening surface lies substantially under the gas generator.

The present invention further has the task of simplifying the installation of the gas generator in the housing.

The actual fastening of the gas generator and housing is by means of bolts, which extend radially from the gas generator through holes in the housing wall. But since, as already mentioned, it is desirable that at least one section of one end of the gas generator extend through an opening in a side section of the peripheral side wall, it is necessary to mount the gas generator into the housing with a type of tipping motion. Such an installation motion could be automated only at very great expense, and requires a very high level of dexterity of the executing installer, which in turn means that the installation is relatively time-consuming.

In order to avoid the above referenced tipping motion during installation, according to the invention at least the region of the side wall section in which the opening is arranged runs obliquely to the gas generator axis. "Obliquely" here is understood to mean any angle which lies between 0° and 90°. Preferably the angle is between 40° and 80°; more preferably between 50° and 70°. In this way, the gas generator can be installed in a simple linear motion, and despite this the requirement can be fulfilled that at least one part of the end of the gas generator, which holds the igniter, projects from the housing.

The arrangement according to the invention of the fastening flanges and the embodiment of the opening according to the invention can be very well combined, so that generally an airbag module can be made available which on the one hand can be easily assembled, and which on the other hand requires only relatively small fastening mating surfaces in the vehicle, which thus contributes generally to economization.

The exemplary embodiments of the invention are described in more detail below with reference to the attached figures. In the figures,

DESCRIPTION OF PREFERRED EXEMPLARY EMBODIMENTS

Figure 1:
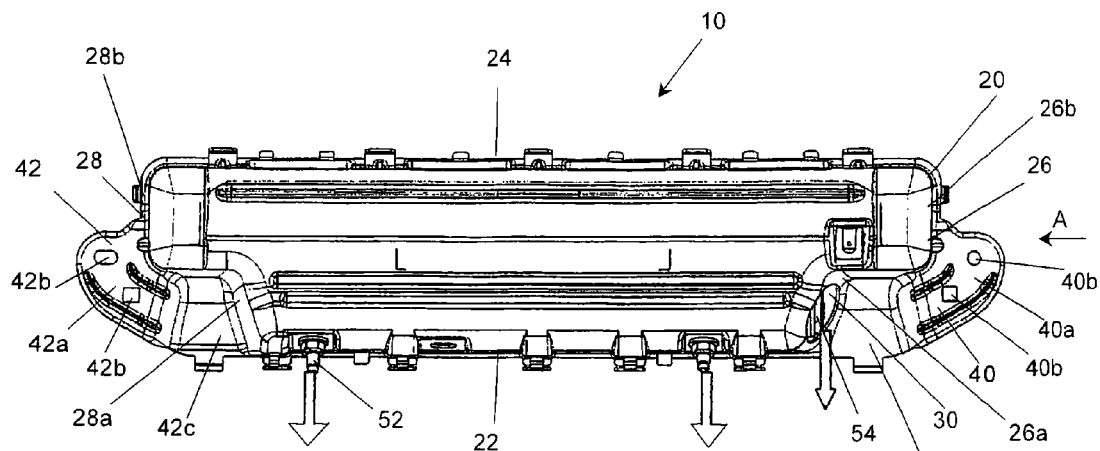
FIG. 1 shows an exemplary embodiment of a knee airbag module according to the invention in a top view.
Figure 2:
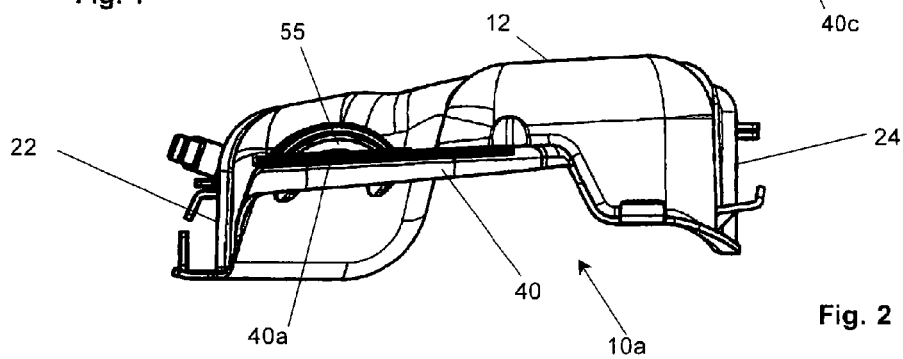
FIG. 2 shows the embodiment of FIG. 1 from viewing direction A.
Figure 3:
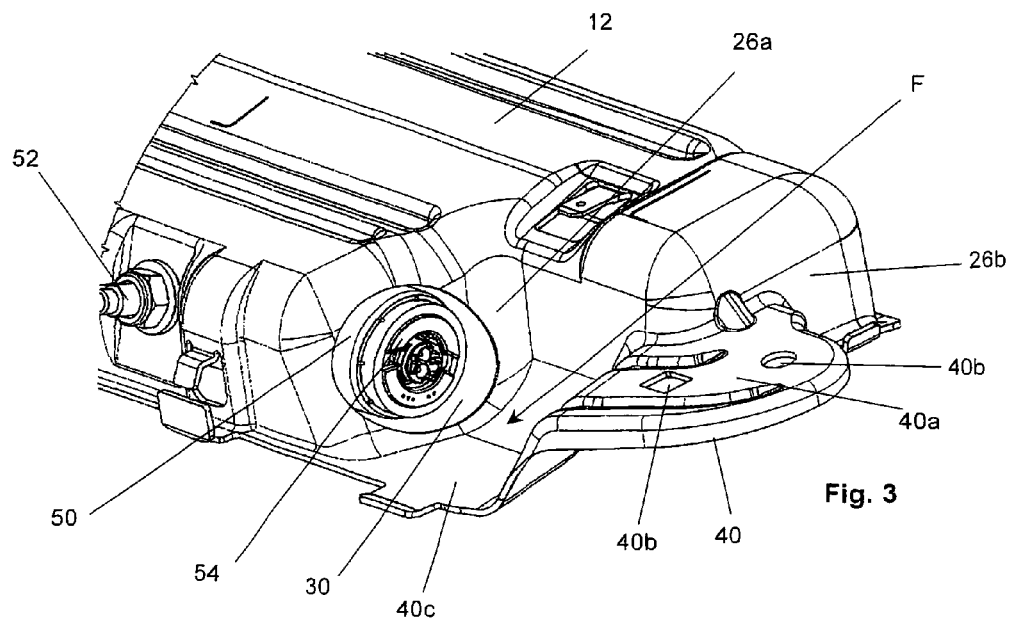
FIG. 3 shows a portion of the assembly shown in FIGS. 1 and 2 in a perspective view.

FIGS. 1 to 3 show a first exemplary embodiment of an airbag module according to the invention from different views, wherein the airbag is not shown folded into the housing. The airbag module consists, apart from the airbag, which as mentioned was not shown, substantially of a housing 10 and a gas generator 50, which is located inside the housing. Of the gas generator, only an axial end 54 with igniter can be seen in the drawings. The figures, in particular FIG. 2, show the installation orientation of the housing 10, in which the opening 10a of the housing aims downward, and when mounted in the vehicle, is covered by a cover element, which is not shown. The housing 10, which preferably is a molded metal piece, but can also be made of plastic, has an upper wall 12 and a peripheral side wall 20, which again has a front section 22, a rear section 24, and two side sections 26 and 28. The designations "top," "front" and "rear" refer hereby to the installation orientation in the vehicle, that is, the front section 22 aims forward in the direction of travel, and the rear section 24 in the direction of the occupant. The two side sections 26 and 28 each have a front region 26a and 28a, and a rear section 26b and 28b. The front regions 26a and 28a are tapered with respect to the rear regions 26b and 28b. The gas generator 50 is formed from an elongated cylinder and extends parallel to the front section 22 of the side wall 20 and adjacent to the section. The fastening bolts 52, which extend through the corresponding holes in the front section 22, and which are screwed to the housing 10 with nuts, as is particularly evident from FIG. 3, extend from the gas generator 50 in a radial direction.

It can be seen in particular from FIGS. 1 and 3 that there is an opening 30 in a front region 26a of a side section 26. Through the opening, the end 54 of the gas generator 50, which holds the igniter, projects in part from the housing 10, so that even after installation of the knee airbag module, it is easily accessible, in order to be able to mount the plug of an igniter cable. The front region 26a of this side wall section (and accordingly also the front region 28a of the opposite side wall section 28) runs obliquely with respect to the gas generator axis in such a way that the housing is tapered in the direction of the front section 22 of the side wall. The bias angle between the gas generator axis and the front region 26a of the side wall section is around 60°. The form of the opening 30 is selected such that it has the shape of a circle when the opening 30 is viewed in the axial direction of the gas generator, meaning that on the basis of the obliquely running front region 26, in which the opening 30 is located, the opening has the form of an oval. This once again means, as can be seen in FIGS. 1 and 3, that the region of the end 54 of the gas generator 50 adjacent to the front section 22 of the side wall 20 lies outside the housing 10, while the opposite region of the end 54 of the gas generator lies inside the housing. Thus the installation of the gas generator 50 is very simple; namely, it is done in a linear movement corresponding to the arrow in FIG. 1, in the direction of extension of the fastening bolts 52. Tipping motions are hereby not necessary, and despite this part of the end 54 with the igniter lies outside the housing 10, as is desired.

At the point where the front regions 26a and 28a of the side sections 26 and 28 transition into the rear regions 26b and 28b, the housing widens sharply, so that the opening 30 and thus also the end 54 of the gas generator 50 cannot be seen by the occupant if no additional measures are taken.

As can likewise be seen from FIGS. 1 to 3, a fastening flange 40 and 42 extends from each side section 26 and 28. The two fastening flanges 40 and 42 are symmetrical with respect to one another, so that below reference is made to only one fastening flange 40. The fastening flange 40 has a fastening section 40a, the flat, upward facing top surface of which forms the fastening surface. Two fastening holes 40b are arranged in the fastening section 40a and penetrate the fastening surface. It can be seen in particular from FIGS. 1 and 2 that the fastening surface is arranged such that if gas generator is mentally extended in the axial direction, the gas generator would cut the fastening surface 40a. Since, when the gas generator is mounted, the plug of the ignition cable still has to be arranged, it is necessary for the fastening section 40a of the fastening flange 40 to be spaced apart from the end 54 of the gas generator, so that a free space F is formed between the fastening section 40a and the end 54 of the gas generator 50. Under this free space F, the fastening flange has an additional connecting section 40c connected to the side wall 20 to improve stability.

The advantage of this arrangement of the fastening section 40a of the fastening flange 40 can be recognized directly with reference to FIG. 2. The fastening surface nearly cuts the extension of the gas generator axis. Since all forces of the expanding airbag are substantially directed into the gas generator, on which the airbag is held, the result is that only very slight torques act on the fastening surface. Accordingly, the two fastening holes can be positioned quite closely to one another, which again means that a corresponding fastening mating surface in the vehicle, against which the fastening surface lies, must be designed as relatively short (in the longitudinal direction of the vehicle).

Basically, the fastening section 42a of the other fastening flange 42 would not need to have any space from the corresponding lateral section 28. However, it is preferable to implement the housing 10 (as far as the opening 30) symmetrically, as the forces arising from ignition of the gas generator and expansion of the airbag is symmetrical.

Figure 4:
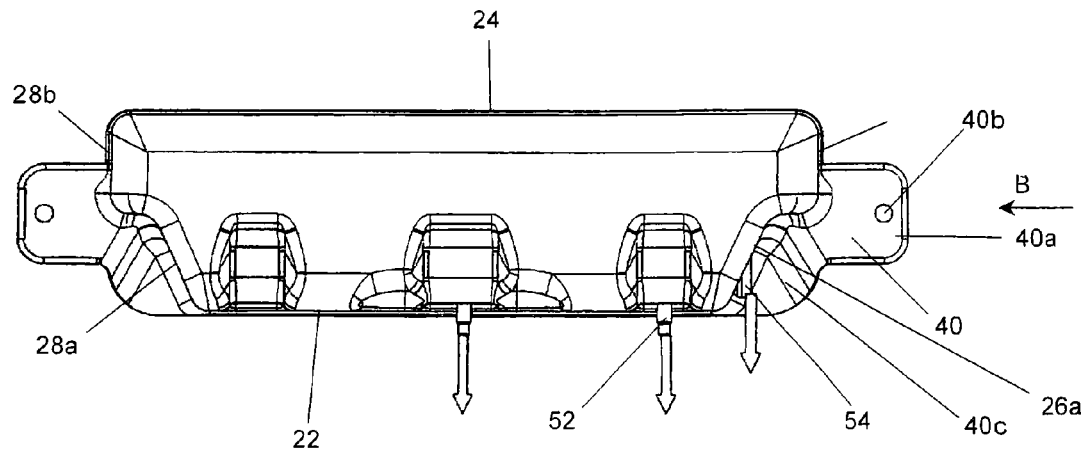
FIG. 4 shows a second exemplary embodiment in a view corresponding to FIG. 1.
Figure 5:
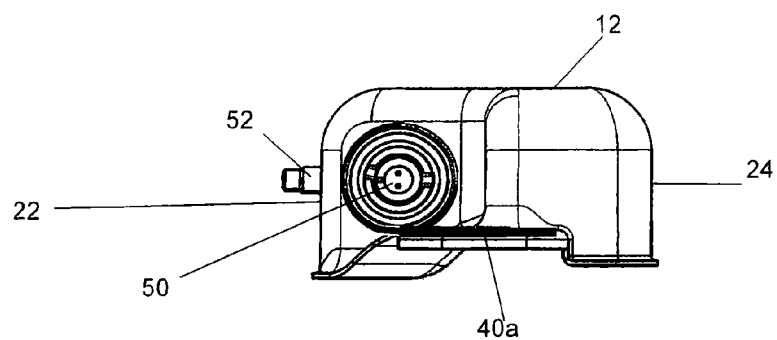
FIG. 5 shows the assembly shown in FIG. 4 from viewing direction B.
Figure 6:
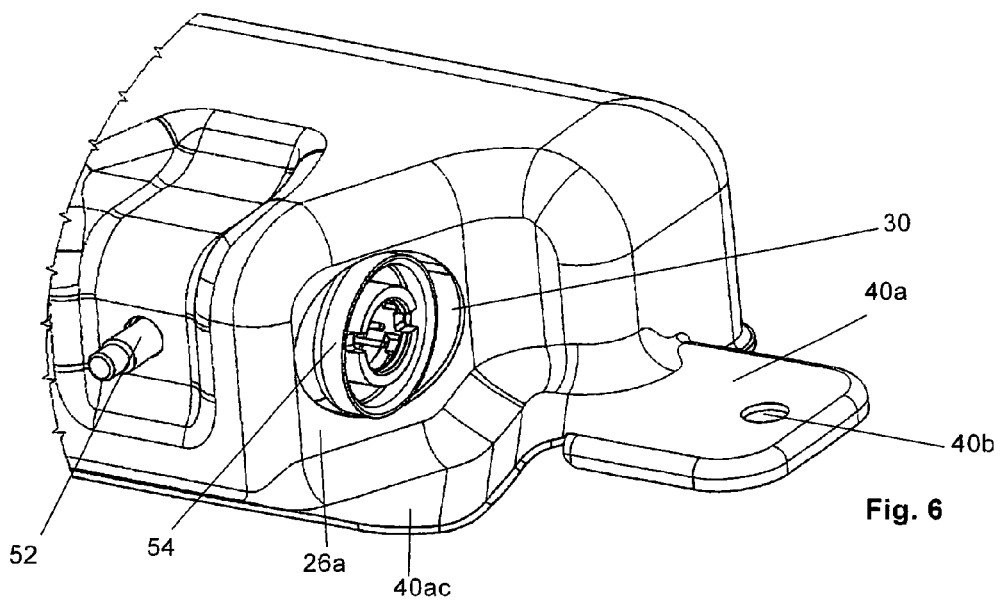
FIG. 6 shows a portion of the assembly shown in FIGS. 4 and 5 in a perspective view.

FIGS. 4 to 5 show a second exemplary embodiment in the views corresponding to FIGS. 1 to 3. As can easily be seen from the figures, the same applies as in the first exemplary embodiment as regards the installation position of the gas generator 50 and the opening 30 in a front region 26a of a side section 26, so that this does not have to be addressed again separately. Here also, the gas generator 50 can be mounted in linear movement indicated in the arrows on the housing 10.

The main difference from the first exemplary embodiment is here, that the position of the fastening sections 40a and 42a of the fastening flanges 40 and 42 is somewhat different. Namely, the fastening sections lie somewhat under the gas generator, so that the gas generator, when it mentally extended in the axial direction, would lie above the fastening surfaces of the fastening flanges 40, 40a and 42a, so that this extension of this gas generator overlaps the fastening surfaces only in a vertical projection from above, that is, in a projection perpendicular to the fastening flanges (as corresponding to FIG. 4). The lever forces acting on the fastening surfaces can indeed be somewhat larger here than in the first exemplary embodiment, but are still quite low. Here also the fastening section 40*a* of the fastening flange 40, which is located on the side of the opening 30, is spaced in the axial direction from the end 54 of the gas generator, so that plugging in the plug of the igniter cable is still easy when the module is mounted in the vehicle.

One can see that in both exemplary embodiments, free access to the end 54 of the gas generator 50 is achieved on the one hand through the obliquity of the corresponding front regions 26*a* of the side wall section 26, and by the fact that the front region 26*a* is generally tapered with respect to the rear region 26*b* of the side wall section 26.

While the above description constitutes the preferred embodiment of the present invention, it will be appreciated that the invention is susceptible to modification, variation and change without departing from the proper scope and fair meaning of the accompanying claims.

The invention claimed is:

1. A knee airbag module comprising a housing (10), an airbag accommodated in the housing and a substantially cylindrical gas generator (50) accommodated in the housing for filling the airbag, wherein the housing (10) has an upper wall (12) and a peripheral side wall (20) having a front section (22) and a rear section (24) and a first side section and a second side section (26 and 28), wherein at least one of the first and second side sections (26 and 28) has, adjacent to the front (22) section, an opening (30) through which one end (54) of the gas generator (50) passes at least in part through the side wall from each of the first and second side sections a respective fastening flange (40 and 42) extends with a respective fastening section (40*a* and 42*a*) each having a fastening surface, wherein the fastening surfaces overlap the radial extension of the gas generator (50) in a vertical projection direction, wherein at least the fastening section (40*a*) of the fastening flange (40) which is adjacent to the opening (30) is spaced apart from the end (54) of the gas generator (50), and wherein an axial projection of the gas generator cuts the fastening surfaces.

2. The knee airbag module according to claim 1, wherein at least one of the fastening sections is spaced apart from the end of the gas generator in the axial direction of the gas generator.

3. The knee airbag module according to claim 1, wherein at least one of the fastening flanges, in addition to the fastening section, has an additional connecting section offset in the vertical direction and in the axial direction with respect to the fastening section.

4. The knee airbag module according to claim 1, wherein at least the region of the side wall section (26) in which the opening (30) is arranged runs obliquely to the gas generator axis.

5. The knee airbag module according to claim 1, wherein the side sections of the side wall each have a front region and a rear region, wherein the housing widens sharply in a transition region between the front and rear regions.

6. The knee airbag module according to claim 1, wherein fastening bolts extend from the gas generator in a radial direction through holes in the housing.

7. The knee airbag module according to claim 6, wherein the holes are located in the rear section of the side wall.

8. A knee airbag module comprising a housing (10), an airbag accommodated in the housing and a substantially cylindrical gas generator (50) accommodated in the housing for filling the airbag, wherein the housing (10) has an upper wall (12) and a peripheral side wall (20) having a front section (22), a rear section (24) and first and a second side section (26 and 28), wherein at least one side section (26 and 28) has, adjacent to the front (22) section, an opening (30) through which one end (54) of the gas generator (50) passes in part through the side wall, wherein at least a region of the side wall section (26) in which the opening (30) is arranged runs obliquely to the gas generator axis and the end (54) of the gas generator (50) lies outside the side wall section (26) in an angular portion adjacent to the front section (22) of the side wall (20), while the end (54) lies inside the side wall section (26) in an angular portion remote from the front section (22).

9. The knee airbag module according to claim 8, wherein the side sections of the side wall each have a front region and a rear region, wherein the housing widens sharply in a transition region between the front and rear regions.

10. The knee airbag module according to claim 8, wherein fastening bolts extend from the gas generator in a radial direction through holes in the housing.

11. The knee airbag module according to claim 10, wherein the holes are located in the rear section of the side wall.

* * * * *